United States Patent [19]

Bremer, Jr.

[11] 4,187,597
[45] Feb. 12, 1980

[54] TORSIONAL VIBRATION DAMPER HAVING TWO PART HUB

[75] Inventor: Robert C. Bremer, Jr., Brownsburg, Ind.

[73] Assignee: Wallace Murray Corporation, New York, N.Y.

[21] Appl. No.: 935,012

[22] Filed: Aug. 18, 1978

Related U.S. Application Data

[62] Division of Ser. No. 724,058, Sep. 16, 1976, Pat. No. 4,150,587.

[51] Int. Cl.² ............................................. B25B 27/14
[52] U.S. Cl. .............................. 29/281.3; 29/243.52; 29/283.5
[58] Field of Search ............... 29/283.5, 281.3, 281.1, 29/281.5, 243.52, 283

[56] References Cited

U.S. PATENT DOCUMENTS 1,777,772  10/1930  Shera .................. 29/243.52

FOREIGN PATENT DOCUMENTS 920847  12/1954  Fed. Rep. of Germany ........ 29/243.52
542320   1/1942  United Kingdom .................. 29/243.52

*Primary Examiner*—James L. Jones, Jr.
*Attorney, Agent, or Firm*—Thomas J. Greer, Jr.

[57] ABSTRACT

A torsional vibration damper and method and apparatus for its manufacture. The outer inertia member carries a radially inwardly extending web, the web sandwiched by a pair of elastomer members. A two-piece hub sandwiches the elastomer members, the two hub pieces being held together as by swaging or by rivets. Tooling for the swaging mode of assembly is shown such that the elastomer members are deformed from an original to a final configuration, and the swaging then accomplished with a single continuous movement. The swaging assembly apparatus for the device includes Belleville springs, the apparatus limiting the maximum force applied to that portion of the hub members controlling the assembled elastomer thickness. The damper configuration facilitates low specific energy dissipation and large elastomer-to-metal interface area to thus tend to lower shear stress in the elastomer. In addition, should the elastomer fail in use, the damper inertia mass is mechanically constrained to remain with the hub assembly. The two hub pieces cause radial extrusion of the elastomer, the extruded portions contacting the inertia member, the latter guiding and defining the extrusions.

1 Claim, 12 Drawing Figures

TORSIONAL VIBRATION DAMPER HAVING TWO PART HUB

This is a division of application Ser. No. 724,058 filed Sept. 16, 1976, now Pat. No. 4,150,587.

This invention relates to torsional vibration dampers of the type employed in internal combustion engines. Such dampers find wide application in internal combustion engines for automobiles, as well as the diesel engines commonly employed in the trucking industry.

The crankshaft of an internal combustion engine is usually subject to torsional vibrations. Such vibrations arise from the sequential explosion of combustible gases in the several cylinders. After one cylinder has fired a certain length of time elapses before the firing of another cylinder. The application of forces of rotation to the crankshaft of an engine is accordingly not smooth and continuous. Only if the number of cylinders were nearly indefinitely increased would such torsional vibrations be substantially eliminated. While the crankshaft is turning at, for example, 3000 rpm, delivering power to the wheels of the vehicle, it is executing torsional oscillations of, for example, one-fourth of one degree twist between the flywheel and the front pulleys at a frequency of 150-250 cycles per second. In certain cases, the natural frequency of torsional vibration of the crankshaft may coincide with a particular firing frequency or harmonic of that frequency with the result that resonance may be amplified. Such an action causes appreciable strains in the crankshaft and may result in immediate failure or lead ultimately to its fatigue failure.

For a long number of years, workers in this art have recognized this problem and have constructed a variety of devices to lessen such torsional vibrations. One common form of torsional vibration damper is that defined by a hub coupled to the crankshaft either directly or indirectly. The hub carries an elastomer element around its rim, and the elastomer element is, in turn, coupled to an outermost annular member. This outermost annular member is often termed the inertia member. In the case of torsional vibration, the hub executes such vibrations in phase with the crankshaft because it is rigidly coupled to it. The inertia member is coupled to the hub by the elastomer and accordingly there is a phase lag between the oscillations of the hub and the corresponding oscillations of the inertia member. In the case of a vibration damper of this type, a portion of the energy of the torsional vibrations would be transformed into heat in the elastomer member and thereby dissipated. The heat arises in the elastomer member by virtue of internal or molecular friction within it. The phase difference between the inertia member and the hub member stretches or deforms the elastomer, such mechanical perturbation being resisted by intermolecular forces of both conservative and non-conservative nature.

For a given damper application, i.e., a damper for a specific engine, it is known in the art to use as much elastomer (volumewise) with as much shear area (interface area between metal and elastomer) as possible to minimize both the power absorbed per unit of volume and also to minimize shear stress. In practice, space limitations preclude simply expanding the width or the diameter of the damper to achieve these low values.

The practice of this invention facilitates the design of torsional vibration dampers having these desirable properties within given space limitations. The damper of this invention also exhibits high radial and axial stiffness. The invention further comprehends a desirable assembly apparatus for constructing those modifications of the invention which utilize metal deformation, such as swaging, to hold the damper elements in their assembled relation.

Figure 1:
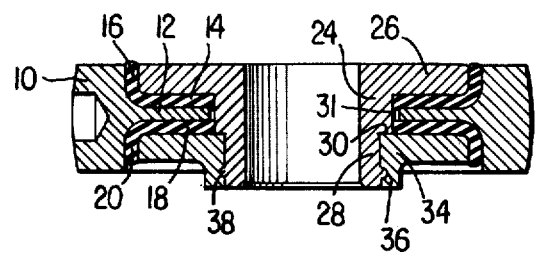
FIG. 1 is a longitudinal axial cross-section of a torsional vibration damper of this invention.

Referring now to the damper shown at FIG. 1 of the drawings, th numeral 10 denotes an outer inertia member in the form of a continuous ring, i.e., an annular member. The numeral 12 denotes an annular and radially extending web or tongue extending inwardly from and integral with the inertia member, the web positioned generally midway of the inertia member's axial extent. The numeral 14 denotes a first elastomer annulus originally in the form of a flat disc or washer and now having a radially outermost portion 16 which extends in a generally axial direction. The numeral 18 denotes a second elastomer annulus, also originally in the form of a flat disc or washer and now having a radially outermost portion 20 also extending in a generally axial direction. The numeral 24 denotes an annular hub member of piece, the hub including a upper flange portion 26 and a radially innermost sleeve portion 28. A radially extending annular shoulder 30 extends between sleeve portion 28 and an intermediate annular, axially extending surface 31 of the hub. The numeral 34 denotes an annular clamping ring which may also be termed a second hub member or piece. Numeral 36 denotes a continuous annular groove or channel in the inner surface of ring 34, the groove receiving a radially outwardly swaged portion 38 which is integral with sleeve portion 28, the swaging having taken place by a method and apparatus described below.

The reader will observe that the web 12 axially locks the inertia member 10 relative to the hub 24 and clamping ring 34 and thus precludes relative axial excursions between these elements. The elastomer members are maintained compressed (distorted) by the retaining forces after assembly. If desired for a specific application, an adhesive bond may be provided between one or both elastomer members and an associated interface. It will further be observed that elastomer elements 14 and 18 need not be of the same thickness or of the same properties. Thus, one may be selected for its high resistance to torque and the other for its high conversion of rotary oscillations into heat. The inertia and hub members are formed of metal, although non-metal materials such as a reinforced plastic may be employed.

Referring now to FIGS. 2-6 of the drawings, an apparatus and method for assembling the torsional vibration damper of FIG. 1 will now be described.

The numeral 50 denotes an annular cup having a central aperture 51 and a lower face 52. The numeral 56 denotes a movable anvil element of generally annular construction also having a central aperture therethrough. An outermost radially extending face 58 is carried by anvil 56, the anvil also carrying a radially extending, intermediate face 60 communicating with tapered bore portion 62, the latter communicating with an innermost radially extending annular face 63.

The numeral 70 denotes a central stud in the form of a cylinder having an upper portion 74 of somewhat lesser diameter, the anvil or base portion of 70 denoted by the numeral 72 and being of maximum diameter and stepped. Belleville springs are denoted generally by the numeral 80 and extend between base 72 and anvil 56, urging these two members apart. Such springs may be chosen to have the well known property of a near zero local spring rate after a certain deflection and before the portion where no further deflection can take place thereof is attained, as is more fully shown at a portion of FIG. 7. Anvil 56 is slidable relative to stud portion 70, as is cup 50. The several elements of the torsional vibration damper of FIG. 1 are now placed as indicated in the apparatus shown in FIG. 2. For convenience in explaining the action, the attention of the reader is invited to Scale 1 of each of FIGS. 2–6 which indicates the displacement of cup 50 under the influence of some externally applied force and also to Scale 2 which indicates the displacement of anvil 56 against the Belleville springs. The reader will understand that base portion 72 is considered fixed or immovable.

Figure 2:
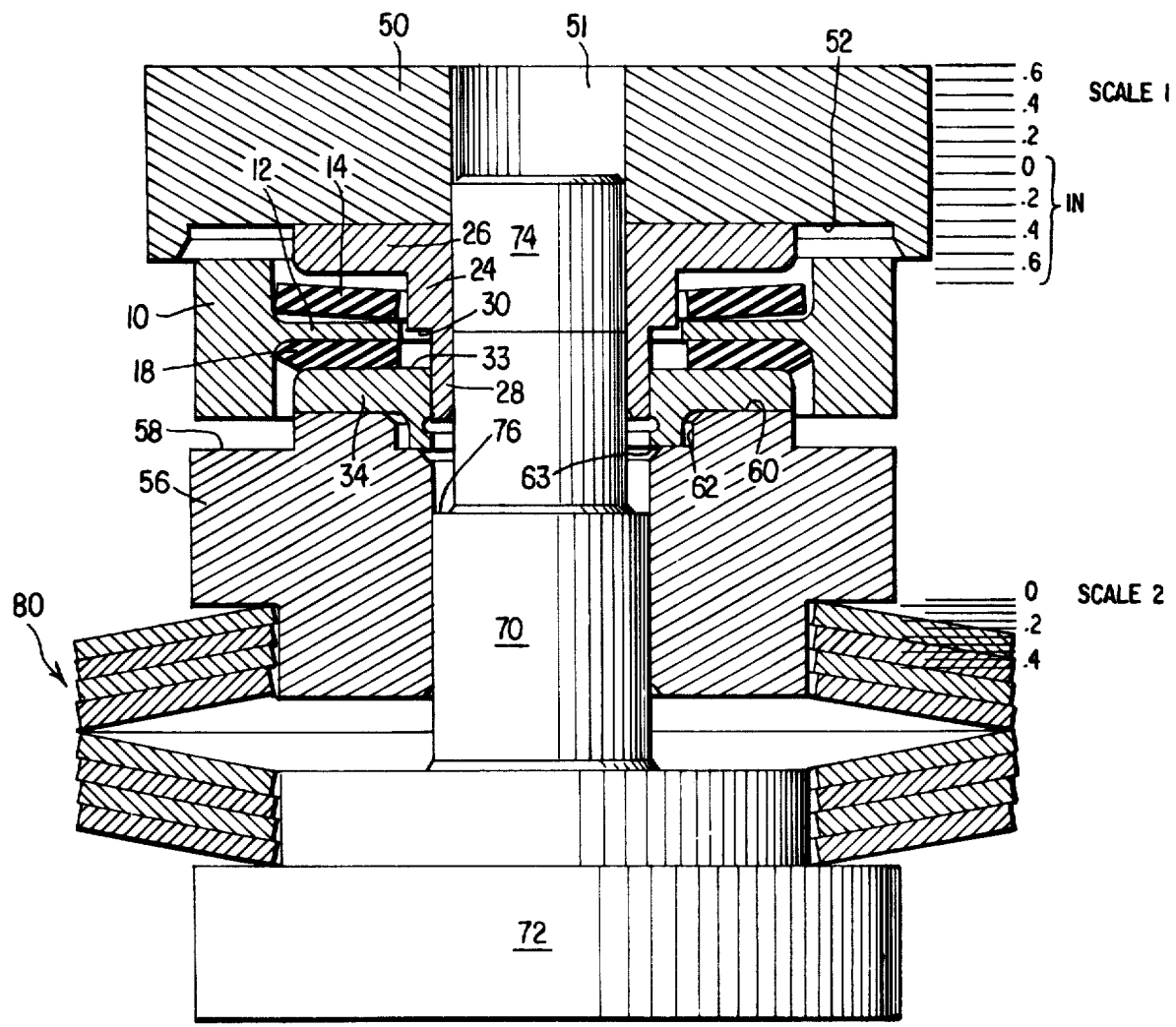
FIG. 2 is a longitudinal cross-section of an apparatus for assembling the damper of FIG. 1, and illustrates the mode of assembly at the initial stage of damper assembly.

Force is applied from right to left, as indicated by the arrow at FIG. 2, to cup 50. This force may be derived from a hydraulic ram or any other device capable of exerting large forces. At FIG. 3, the cup 50 has moved downwardly, as may be noted by reference to Scale 1, and elastomer discs 14 and 18 commence to deform, with a portion of each being forced radially outwardly and into the space between the two hub portions 24 and 34 and the radially innermost portion of inertia member 10. Belleville springs 80 and annular anvil 56 have moved only slightly between the positions shown at FIGS. 2 and 3. At FIG. 4, the deformation of the elastomer discs 14 and 18 is very nearly complete and the reader will observe the formation of axially extending portions 16 and 20. The reader will also note at FIG. 4 that significant deflections of Belleville springs 80 has taken place, along with attendant motion above them. At FIG. 5, the clamping ring 34 at portion 33 thereof has no contacted radially extending shoulder 30 of hub 24 and, further, the desired distortion of the elastomer members 14 and 18 is complete. Further elastomer compression is restricted by mechanical contact between the two hub members at shoulder 30 of hub 24. That is to say, it is now desired that no further squeezing force may be applied to the two hub members 24 and 34 that would continue with relative axial motion between the two. In the particular example given, a force of 10 tons is the force required to squeeze the elastomers to the final desired assembly configuration. A load between the two hub members in excess of 10 tons would begin to deform the contact shoulder (30) between the two. However, the desired swaging has not yet taken place. The Belleville springs have now reached the point in their load-deflection curve whereby further compression of these springs takes place without significant additional force.

Figure 5:
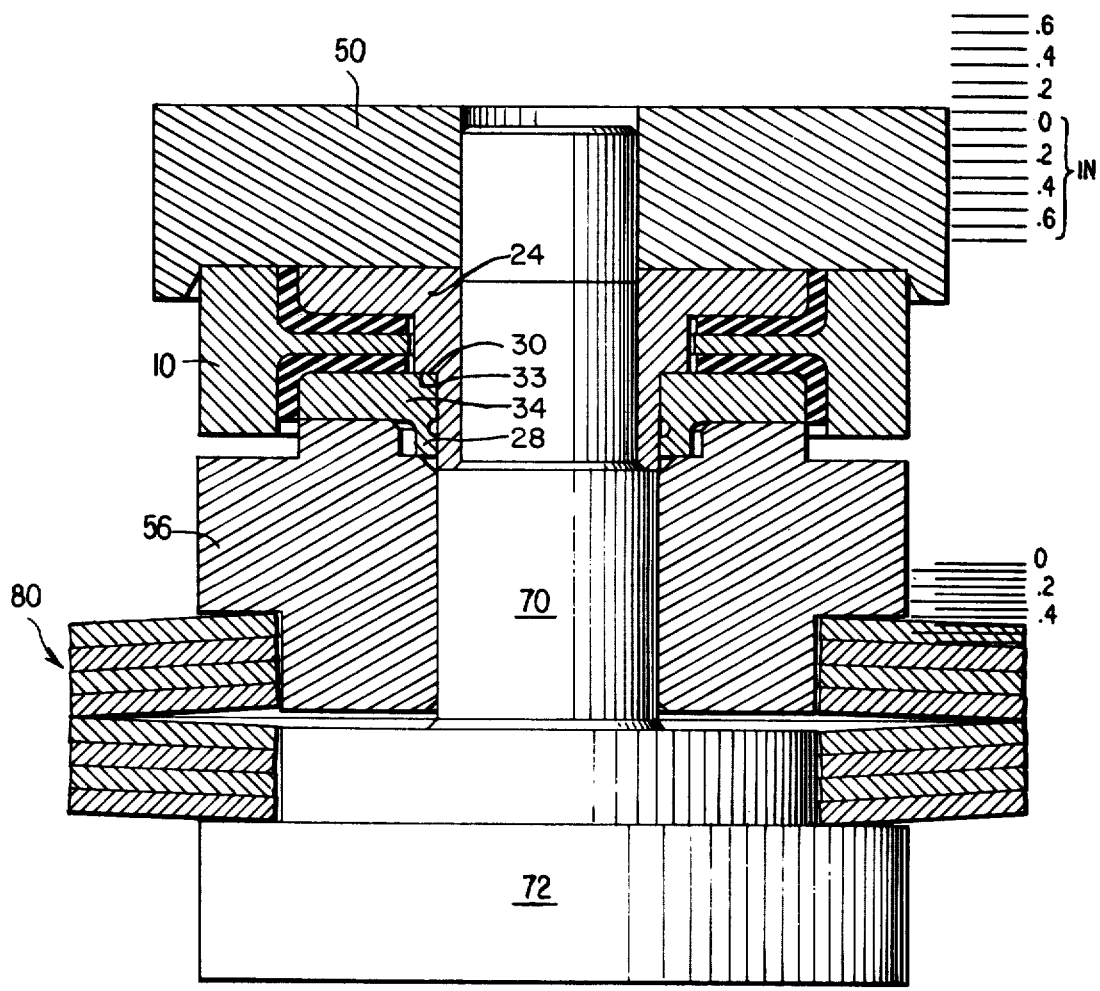
Figure 6:
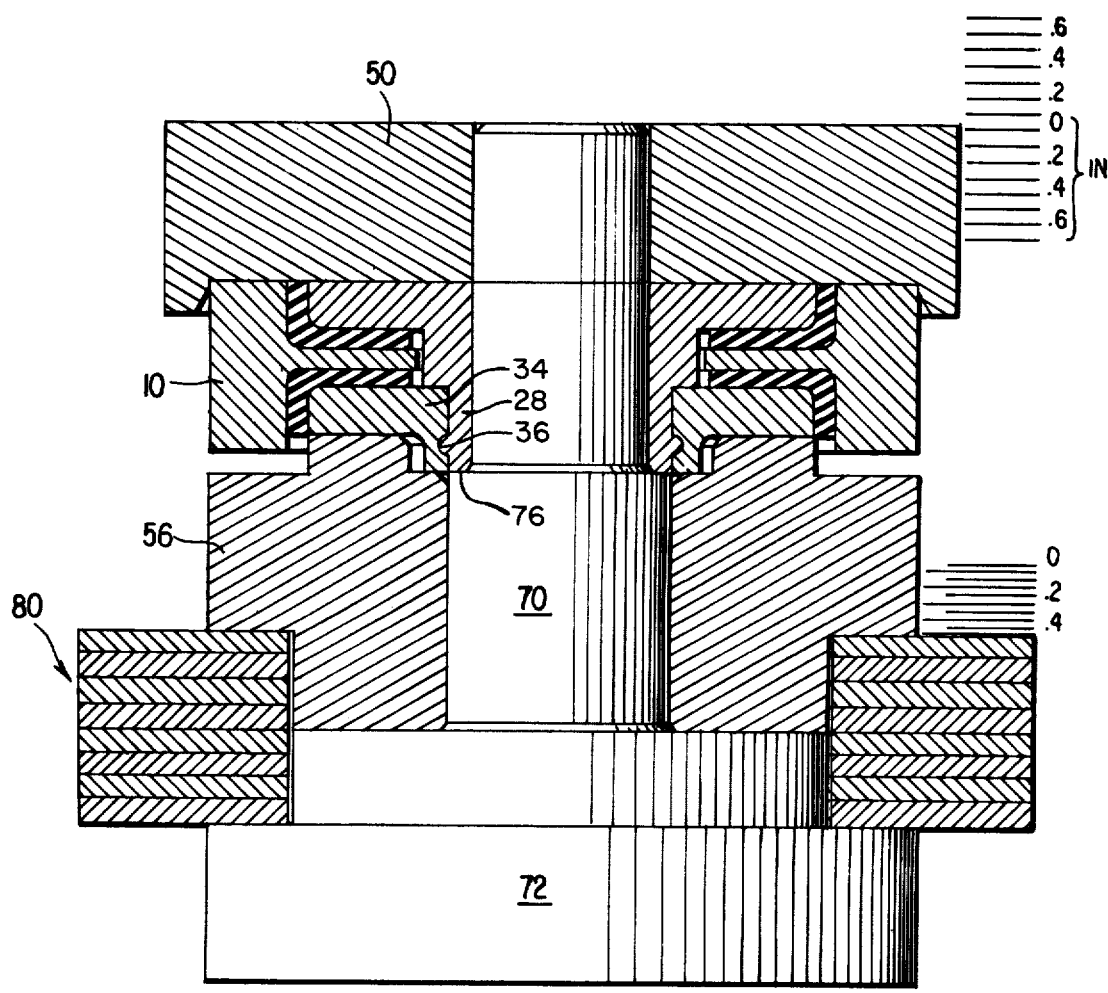

Continued motion of the cup 50 induced by the ram towards the left now causes, in passing from the configuration of FIG. 5 to that of FIG. 6, the lefthand end of sleeve 28 to abut annular shoulder 76 of stud 70. Such abutment forces a portion of the material of sleeve 28 radially outwardly and into groove 36 of clamping ring 34. The portion which so is deformed into the groove is denoted by the numeral 38 at FIG. 1.

Figure 3:
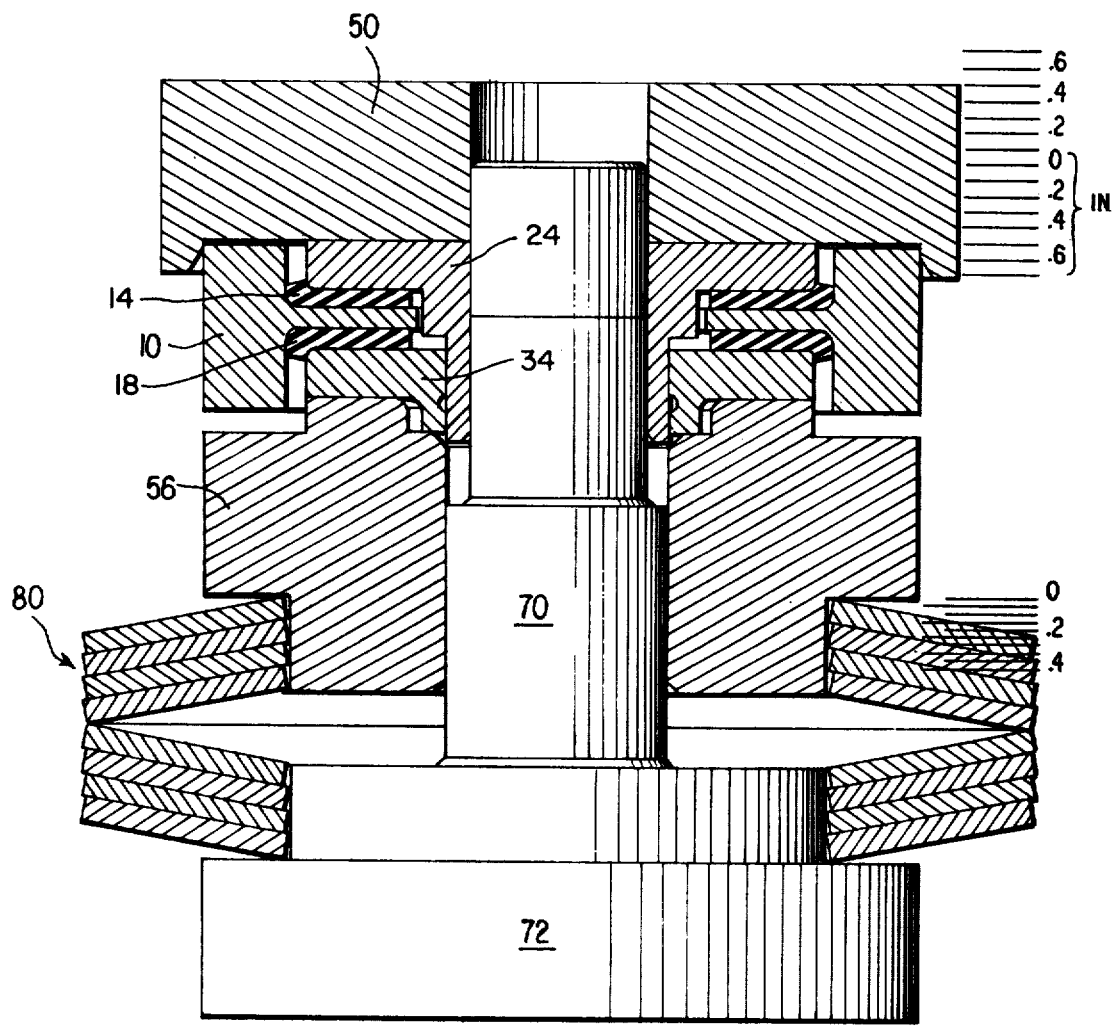
FIGS. 3-6 are similar to FIG. 2 and illustrate various stages of damper assembly.
Figure 4:
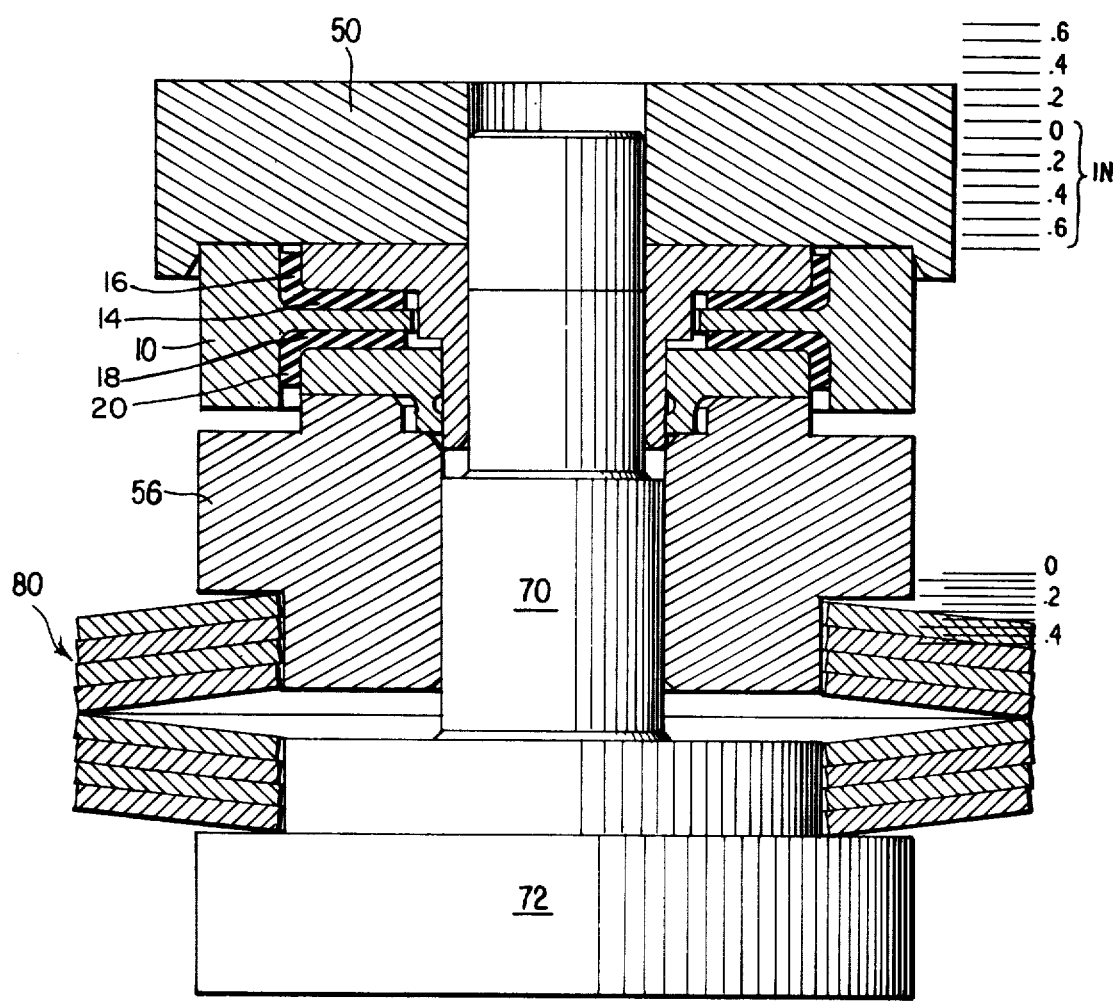
Figure 7:
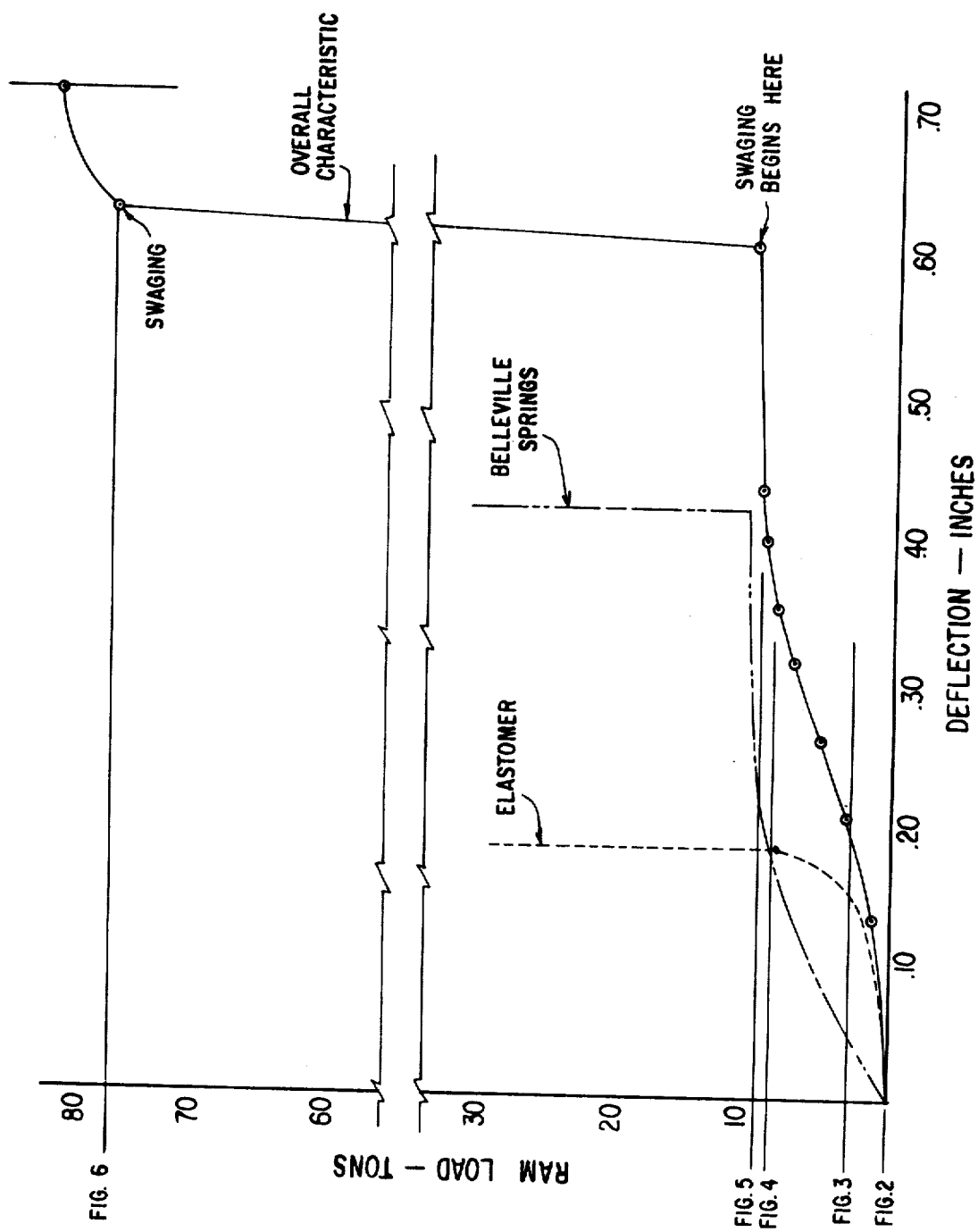
FIG. 7 is a chart containing certain curves which illustrate the mode of assembly of FIGS. 2-6.

Referring now to FIG. 7 of the drawings, a chart for a particular example, illustrating the various Load vs. Deflection properties of several of the elements shown at FIGS. 2–6 is illustrated. At FIG. 2, the elements of the damper have just been placed into the assembly apparatus and no appreciable loads of any sort are present. When the stage indicated at FIG. 3 is reached, the ram load is three (3) tons and the Belleville springs 80 have deflected approximately 0.04 inches. Similarly, the elastomer elements have undergone an axial deflection of approximately 0.16 inches. When the stage indicated at FIG. 4 is arrived, the ram load is nine (9) tons and the Belleville springs have now been deflected approximately 0.16 inches, and contact between portion 33 of locking ring 34 and shoulder 30 of hub 24 is impending. When the configuration of FIG. 5 has been reached, the desired elastomer deformation corresponding to a force of ten (10) tons has been reached and no further deformation of the elastomer takes place. Similarly, the contact between the radially extending faces 33 and 30 has taken place and swaging has commenced. That is to say, the lower portion of sleeve 28 has just contacted rounded shoulder 76 of stud 70. From the configuration shown at FIG. 5 to the configuration shown at FIG. 6, swaging has occurred, final swaging taking place at a ram load of 75 tons.

Figure 8:
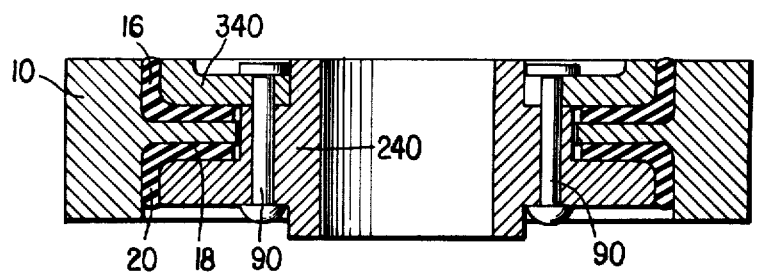
FIG. 8 is a view similar to FIG. 1, and illustrates an embodiment.

Referring now to FIG. 8 of the drawings, another embodiment is illustrated wherein fasteners are employed to hold the two hub portions together, instead of swaging or other metal deformation. At FIG. 8, the numeral 240 indicates a hub portion, similar to hub portion 24 of the previously described embodiment. Similarly, clamping ring or second hub portion 340 is shown and corresponds very nearly in structure and function to clamping ring 34 of the previously described embodiment. A plurality of angularly disposed fasteners, such as rivets 90 hold the damper assembly together. The reader will understand that to fashion the modifications shown at FIG. 8, a cup and anvil similar to cup 50 and anvil 56 of FIGS. 2–6 are employed. After the ram and anvil have squeezed the assembly to the desired degree, rivets 90 are inserted in performed apertures in hub members 240 and 340 to hold them together.

Figure 9:
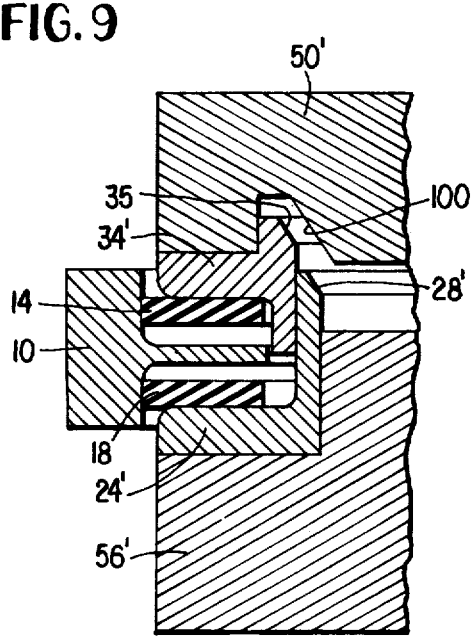
FIGS. 9-11 illustrate another embodiment of the damper of this invention, as well as another assembly apparatus.
Figure 10:
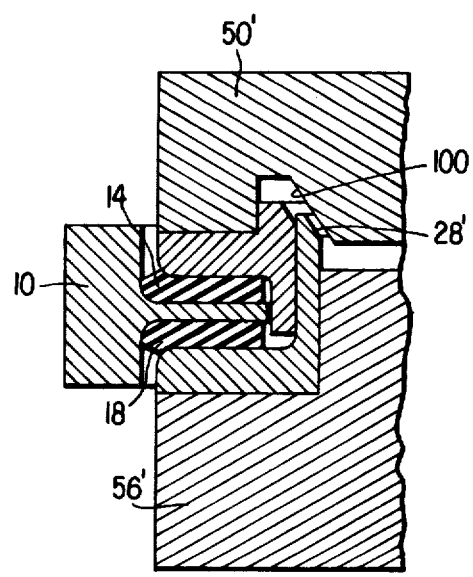
Figure 11:
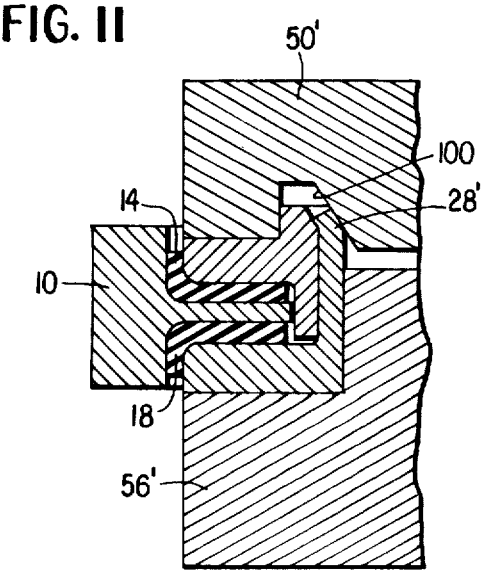

Referring now to FIGS. 9–11, another embodiment of a torsional vibration damper formed in accordance with this invention is given. The essential difference between the embodiments shown at FIGS. 9–11 and that shown at FIG. 1 is that instead of radially swaging a portion of an inner hub into a groove on a clamping ring, the corresponding hub portion is outwardly flared and somewhat clamps the clamping ring. At FIG. 9, the numerals 10, 14 and 18 denote respectively, the inertia member and the two elastomer members. The numeral 24' denotes a hub similar to hub 24 of FIG. 1, while the numeral 34' denotes a second hub member or clamping ring similar to hub 34 of FIG. 1. Cup 50' carries an annular groove on the lower face, the groove including an annular surface 100 biased as illustrated. Anvil 56' receives hub 24'. In passing from the initial stage of FIG. 9 to the final assembly shown at FIG. 11, the cup 50' is urged to the left against fixed anvil 56', with result that the forward end of sleeve portion 28' abuts surface 100 of the cup, forcing this forward portion radially outwardly and against circumferential biased portion 35 of the clamping ring 34'. A fixture similar to the cup 50' and anvil 56' of FIG. 9 may be employed to fabricate the modification shown at FIG. 8 of the drawings.

Figure 12:
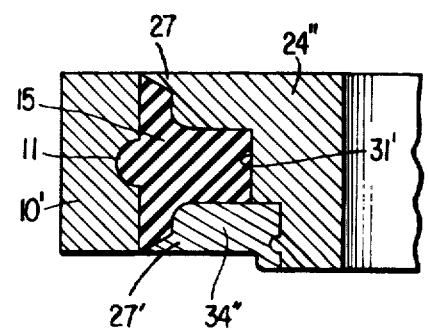
FIG. 12 is a view similar to FIG. 1 and illustrates still another embodiment.

Referring now to FIG. 12 of the drawings, still another embodiment is illustrated. The outer inertia member is denoted by the numeral 10' and carries an innermost groove or channel designated by the numeral 11 on its innermost radial surface centrally of the inertia member. The numeral 24" denotes one of the two hub pieces and includes a ledge or intermediate portion 31' similar to FIG. 31 of the embodiment of FIG. 1. The other piece of the two-piece hub is denoted by the numeral 34", this element functioning as a clamping ring. The numeral 27 denotes the outermost radial portion on the axial faces of each of elements 34" and 24". The numeral 15 denotes an elastomer element which has been axially deformed as in a manner previously described so that it completely fills the volume between the two hub pieces and the groove 11. Prior to assembly, a typical elastomer for the embodiment of FIG. 12 is in the form of an annular member of rectangular cross-section and having an axial dimension somewhat greater than the distance between the innermost portions of elements 24" and 34" and having a radial dimension approximately equal to that between surface 31' and the innermost radial surface of the inertia member 10'. The reader will immediately comprehend that portions 24 on the hubs form a dual function. Firstly, they very nearly completely seal or close the axial faces of the elastomer and accordingly protect the elastomer whenever the damper is used in an environment containing gases, for example, which are harmful to the elastomer. Secondly, they more positively preclude the squiriming of the elastomer out of the damper. The reader will further understand that the embodiment of FIG. 12 need not include radially extending portions 27 on the two hub elements, rather, the radially outermost portions of the two hub pieces may extend parallel to the axis of rotation of the damper. The embodiment shown at FIG. 12 is assembled in either apparatus such is shown at FIG. 2 or at FIG. 9. During assembly, as is also the case with the damper elements previously described, the axial squeezing of the elastomer in an axial direction results in an extrusion of the elastomer radially outwardly, with very little reduction in the inner diameter of the elastomer between its undistorted, initial configuration and its distorted, final configuration. This is true both of the single elastomer embodiment shown at FIG. 12 and the other two elastomer embodiments. In all embodiments, the radially outwardly extruded elastomer is guided by the two hub pieces and also contacts a portion of the inertia member. In the embodiment of FIG. 12, it would be apparent that the elastomer which extends into groove 11 of the inertia member serves to preclude axial excursion of the inertia member with respect to the hub pieces.

It will further be apparent that the precise configuration of the two hub pieces of this invention may vary for specific design applications.

What is claimed is:

1. An apparatus for assembling a torsional vibration damper, the damper being of the type having an outer inertia member carrying a radially extending web, the web sandwiched by a pair of elastomer elements, the elastomer elements being sandwiched by two pieces of a two-piece hub which are held together by deformation, the assembly apparatus including,
   (a) a base from which an integral stud projects, the stud having at least two portions of different diameters, the said two stud portions joined by an annular shoulder, the shoulder forming a swaging deformation zone,
   (b) an annular ram having a through aperture, the aperture receiving at least a portion of the stud,
   (c) an annular anvil having a through aperture, the aperture receiving at least a portion of the stud, the anvil positioned between the ram and the base,
   (d) Belleville springs abutting said base and said anvil and urging the anvil away from the base,
   (e) whereby, with an unassembled damper of the type recited placed between the ram and the anvil, movement of the ram towards the anvil will be resisted by the Belleville springs, thereby compressing and distorting the elastomer members until a flat part of the Belleville spring load-deflection characteristic is reached, at which time the desired maximum compression and distortion of the elastomer elements is reached and further ram movement, to effect deformation of at least one of the hub members, does not result in further distortion of the elastomer members.

* * * * *